Nov. 24, 1925.  
K. K. PARKER  
SHOCK ABSORBER  
Filed Aug. 30, 1923  
1,562,785  
2 Sheets-Sheet 2
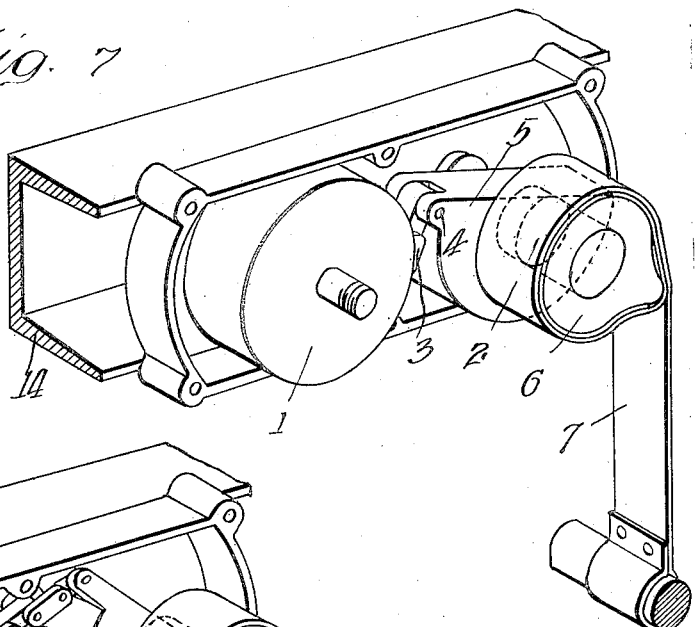
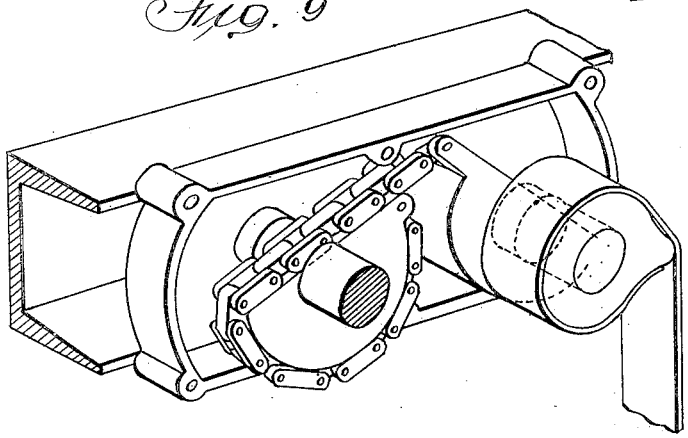
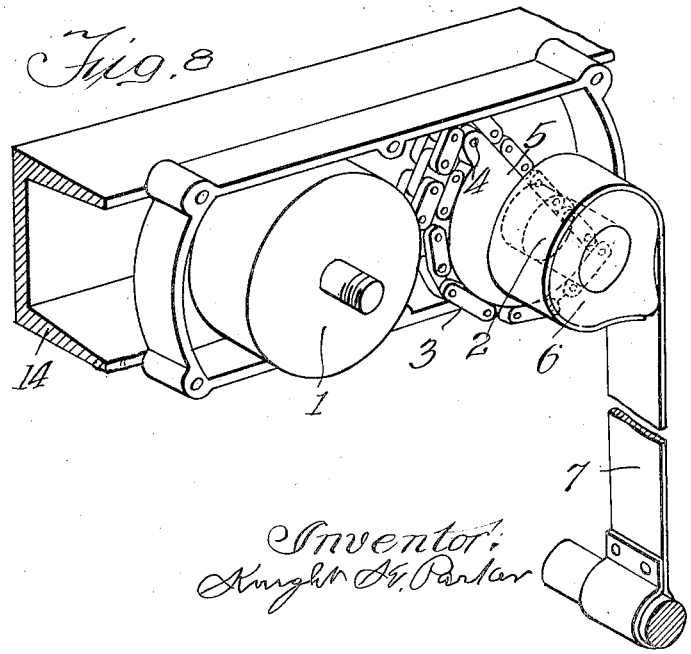
Witness  
Inventor:  
Knight K. Parker Patented Nov. 24, 1925.

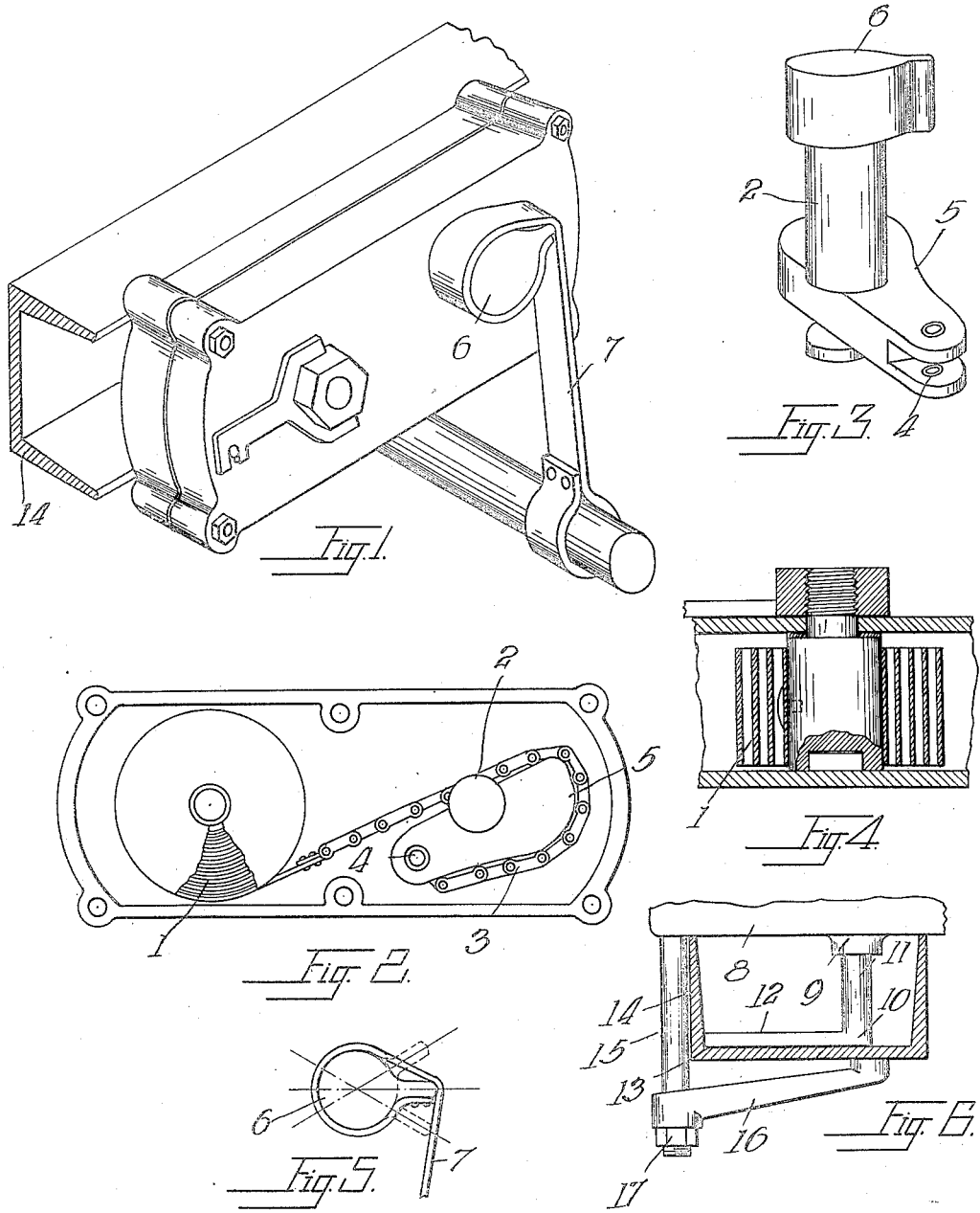

1,562,785

UNITED STATES PATENT OFFICE.

KNIGHT K. PARKER, OF CHICAGO, ILLINOIS.

SHOCK ABSORBER.

Application filed August 30, 1923. Serial No. 660,259.

*To all whom it may concern:*

Be it known that I, KNIGHT K. PARKER, a citizen of the United States, and a resident of the city of Chicago, in the county of Cook and State of Illinois, have invented certain new and useful Improvements in Shock Absorbers; and I do hereby declare that the following is a full, clear, and exact description of the same, reference being had to the accompanying drawings, and to the numerals of reference marked thereon, which form a part of this specification.

This invention relates more particularly to an improved type of a vehicle shock absorber and is a development of the shock absorber covered in my Patent No. 1,170,457, dated February 1, 1916.

It is an object of this invention to provide a shock absorber of compact design and having a housing containing a lubricant for enclosing the working parts to shield the same from the erosive effect of moisture and air.

It is also an object of this invention to provide a shock absorber with means for readily clamping the shock absorber in position on the chassis sill of a vehicle.

It is a further object of the invention to provide a shock absorber having an enclosed protected coiled spring connected with a chain which is attached to a member secured on a rotatable shaft having an outer arm which acts on an exterior conductor connected with the vehicle axle to take up slack in said exterior conductor when the vehicle is subjected to shocks.

It is furthermore an object of this invention to provide a shock absorber wherein a rotative connection is provided between a spring and a rotatable shaft with which a strain conductor is connected so that slack is taken up in said strain conductor by means of a motive conductor connecting the spring with an arm secured on said shaft.

Another object of the invention is to provide a shock absorber wherein a motive strain conductor works about the pivot point of an arm carried by a rotatable shaft and wherein the nearness of approach of the motive conductor to said pivot point determines the minimum of rotative motive which may be reduced to negligible.

Still another object of the invention is the construction of a shock absorber wherein friction is eliminated as a working element and wherein only the strain of a tensioned spring modified by a variable leverage of a strain transmitting system is employed.

It is an important object of this invention to provide a shock absorber of improved construction adapted to be readily and securely mounted in place on a vehicle and furthermore adapted to automatically adjust itself to absorb shocks caused by various conditions of roadways and prevent said shocks from being transmitted to the body of the vehicle.

Other and further important objects of this invention will be apparent from the disclosures in the specification and the accompanying drawings.

The invention (in a preferred form) is illustrated in the drawings and hereinafter more fully described.

On the drawings—

Figure 1 is a perspective view of an improved shock absorber embodying the principles of this invention and shown mounted in position on the chassis sill of a vehicle and connected with the vehicle axle.

Figure 2 is an interior view of the shock absorber with the cover removed and with the exterior parts omitted.

Figure 3 is a detail view of the rotary crank shaft mechanism of the device removed from the housing.

Figure 4 is a fragmentary detail section taken through the housing and the spring mechanism.

Figure 5 is a detail view of the outer end of the crank shaft showing a portion of the outer strain conductor.

Figure 6 is a transverse section of the vehicle chassis sill showing the attaching mechanism for the shock absorber housing.

Figure 7 is a perspective view of the shock absorber with the housing cover removed and illustrating the parts when the vehicle body is at its nearest approach to the vehicle axle.

Figure 8 is a similar view having the parts in the opposite extreme position; that is, when the vehicle body is in a position moving away from the axle.

Figure 9 is a perspective view of a modified form of shock absorber with the housing cover removed.

As shown on the drawings—

The reference numeral 1 indicates a coiled spring to the outer end of which one end of a flexible conductor or chain 3 termed a motive conductor is attached. A nut and wrench mechanism (Figure 1) is provided for winding the spring. The other end of the chain 3 is pivoted at a point 4 to one end of a cross-head or crank arm 5 mounted intermediate its ends on a rotatable crank shaft 2. Secured or formed on the outer end of the crank shaft 2 is a crank arm 6 to which the upper end of a strap of strain conductor 7 is connected. The other or lower end of the strain conductor 7 is looped around the axle of a vehicle and secured to itself as illustrated in Figure 1. The spring 1, the crank shaft 2, motive conductor 3 and the cross head 5 are mounted within a housing 8 comprising a back or body section and a cover. The housing when closed contains a lubricant for the working parts to shield the same from the erosive effects of moisture and air.

Integrally formed on the back of the housing 8 is a boss 9 in which the shank 11 of an angle member 10 is secured. The angle member 10 is engaged in the channel frame or chassis sill 14 of a vehicle with the end of the angle member arm 12 projecting into the corner 13 of the chassis sill 14 as illustrated in Figure 6. A stud bolt 15 is rigidly fixed to the rear section of the housing 8 and projects beneath the chassis sill. A retaining arm or finger 16 is mounted on the stud bolt with the end of said retaining arm pressed against the exterior of the back of the back housing section at a point opposite the shank 11 of the angle member 10. A nut 17 is engaged on the stud bolt 15 to hold the arm 16 pressed against the housing. The shock absorber is thus permanently held in place on the chassis sill 14 of the vehicle.

Figure 9 illustrates a modified form of shock absorber and briefly comprises a housing adapted to be securely clamped on the chassis sill of a vehicle, said housing supporting two rotatable shafts each having an arm or cross head secured or formed thereon. The arms are connected to one another by a chain or flexible member. One of said shafts is connected with a control spring mounted on the back of the shock absorber housing while the second shaft has a crank arm thereon to which one end of a strain conductor is attached. The other end of the strain conductor is connected to the axle of the vehicle.

The operation is as follows:

The shock absorber is adapted to be quickly secured in position on the chassis sill 14 of a vehicle by means of the improved clamping mechanism illustrated in Figure 6.

Normally the motive conductor or chain 3 is positioned as illustrated in Figure 2 and is adapted to work about the crank shaft 2 which is the pivoted point of the cross head 5. The nearness of the approach of the motive conductor to said shaft 2 determines the minimum of the rotative motive which may be reduced to the point of zero. It will thus be noted that in this invention the motive conductor 3 has the least operating effect when it is at its nearest approach to the shaft 2. When a greater operating force is desired the motive conductor moves away from the pivot point or shaft 2.

As the vehicle is subjected to shocks due to irregularities in the road or other causes the body of the vehicle or chassis will tend to move toward the vehicle axle thereby causing a slack in the strain conductor 7. The slack thus caused in the strain conductor 7 is automatically taken up by the action of the spring 1 which acts on the motive conductor 3 causing the same to move away from the pivot point or shaft 2 and rotate the cross head 5 in an anti-clockwise direction looking at Figure 2. This action of the spring 1 and the motive conductor 3 causes rotation of the shaft 2 and the crank arm 6. The crank arm 6 acts on the strain conductor 7 taking up the slack therein and producing a variable strain on said strain conductor 7. With the continued downward movement of the vehicle body toward the axle the operating parts of the shock absorber move toward the positions illustrated in Figure 7. Figure 7 shows the position of the mechanisms when the vehicle body is at the nearest approach to the vehicle axle with the spring 1 having the advantage of the leverage of the cross head 5. With the parts positioned as shown in Figure 7 the spring 1 is most tense and has its greatest leverage thus effectually preventing the vehicle body from rising suddenly and going so high as to endanger the spring of the vehicle.

With the rebound of the vehicle body the shock absorber mechanisms move back toward the positions illustrated in Figure 2 with the spring unwinding and gradually allowing the motive conductor to approach the pivot shaft 2. The shock to the vehicle is thus absorbed by the shock absorbing mechanisms.

In the case of a very severe disturbance or shock in which the vehicle body is carried or moved too high above its normal position to endanger the vehicle springs, the shock absorbing mechanisms move from the positions illustrated in Figure 2 toward the positions shown in Figure 8 in which position the mechanisms intervene with a very powerful retardation with the motive conductor 3 being brought into rapidly increasing action as the body advances in its upward course. The stresses on the vehicle springs are thus obviated to such an extent that no serious results are encountered.

By referring to Figure 2 it will be noted that the minimum rotative motive of the shaft 2 is entirely controlled by the nearness of the approach of the movtive conductor 3 to the shaft 2. It will therefore be obvious that a spring may be introduced in the housing 8 of sufficient action to produce any maximum rotative motive desired, since the motive conductor 3 is pivotally connected at the point 4 on the long end of the cross head or inner crank arm 5.

I am aware that numerous details of construction may be varied through a wide range without departing from the principles of this invention, and I therefore do not purpose limiting the patent granted otherwise than necessitated by the prior art.

I claim as my invention—

1. A shock absorber comprising a housing, a coiled spring therein, a shaft rotatively mounted in said housing and projecting therefrom, an arm in said housing secured on said shaft intermediate its ends, a flexible member connected to said spring and to one end of said arm, a crank arm fixed on the outer end of said shaft, and a flexible member connected to said crank arm.

2. A shock absorber comprising a housing, a shaft journalled in said housing and projecting therefrom, crank arms on said shaft, one of said crank arms disposed within the housing, a spring mounted within said housing, a flexible member connected to the crank arm within said housing and to said spring and adapted to co-act with the periphery of said crank arm, and a strain conductor on the exterior of the housing connected to the exterior crank arm and adapted to co-act with the periphery thereof.

3. A shock absorber comprising a housing, a shaft rotatable in said housing, an arm secured intermediate its ends on said shaft within said housing, a flexible member within said housing pivotally connected at one end to one end of said arm, and a spring in said housing connected to the other end of said flexible member means connected to said shaft for opposing the action of said spring.

4. The combination with a vehicle chassis frame and axle, of a housing clamped on said frame, a spring in said housing, a shaft rotatable in said housing and projecting therefrom, an interior arm secured intermediate its ends to said shaft within the housing, a chain connected to said spring and pivotally connected to one end of said interior arm, an exterior arm mounted on the projecting end of said shaft, and a flexible member having one end thereof secured to the exterior arm and trained therearound and the other end attached to the vehicle axle.

5. The combination with a vehicle chassis frame and axle, of a housing containing a lubricant, clamping means on the housing for securing the housing rigidly to said chassis frame, a coiled spring in said housing, means on the exterior of the housing for winding the spring, a shaft rotatable in said housing and projecting therefrom, an interior arm on said shaft within the housing, an exterior arm on the projecting end of said shaft, a chain having one end secured to said spring and the other end pivotally connected to one end of said interior arm, and a flexible exterior member having one end secured to said exterior arm and the other end secured to the vehicle axle.

6. The combination with a vehicle chassis sill and axle, of a shock absorber housing, means for securing the housing rigidly to the chassis sill, a shaft in said housing and projecting therefrom, means connecting the projecting end of said shaft with the vehicle axle, and mechanisms comprising a double arm, a flexible member adapted to coact with the periphery of said arm and a spring within the housing connected to said shaft to cause rotation of the shaft when the vehicle is subjected to shocks.

7. In a shock absorber the combination with a rotatable shaft, of a pair of arms rigidly secured thereon, a flexible member connected to one of said arms adapted to be wound and unwound thereon, and a flexible member connected with the other of said arms adapted to cause rotation of the same.

8. The combination with a shock absorber of the class described, of a shaft, a crank arm formed on one end thereof, a second arm secured intermediate its ends on said shaft with the periphery of said shaft intercepting one longitudinal edge of said second arm, a strain conductor connected for coaction with said crank arm, a motive conductor connected to said second arm and adapted to be wrapped around the periphery thereof and around said shaft, and means connected to said motive conductor to cause rotation of the shaft.

9. In a shock absorber, the combination with a rotative shaft adapted to be rotated in one direction in response to the recoil of a vehicle spring, of means connected with the shaft adapted to exert a variable moment about said shaft tending to rotate it in the opposite direction, and means adapted to cause said moment to decrease as the tenseness of said first means is increased.

10. In a shock absorber, the combination with a rotative shaft adapted to be rotated in one direction in response to the recoil of a vehicle spring, of resilient means adapted to exert a variable moment thereabout tending to retard the rotation thereof, and means connecting said resilient means with said shaft for causing said moment to decrease as the retardation diminishes.

In testimony whereof I have hereunto subscribed by name.

KNIGHT K. PARKER.